United States Patent [19]

Lariviere widow Giroux

[11] E Re. 29,426

[45] Reissued Oct. 4, 1977

[54] SAFETY STOPPING DEVICE FOR MARINE ENGINES

[76] Inventor: Alice Louise Rosalie Lariviere Giroux, widow, 55 rue de Turbigo, Paris, France

[21] Appl. No.: 637,049

[22] Filed: Dec. 2, 1975

Related U.S. Patent Documents

Reissue of:

[64] Patent No.: 3,726,264
Issued: Apr. 10, 1973
Appl. No.: 127,526
Filed: Mar. 24, 1971

[30] Foreign Application Priority Data

Apr. 10, 1970 France ..... 70.13076

[51] Int. Cl.[2] ..... B60L 3/02; F02P 11/06

[52] U.S. Cl. ..... 123/148 S; 123/198 DC; 180/99; 200/161

[58] Field of Search ..... 123/198 DC, 148 S; 180/99; 115/70; 200/161

[56] References Cited

U.S. PATENT DOCUMENTS

| | | | |
|---|---|---|---|
| 2,377,250 | 5/1945 | Lawson | 200/161 |
| 2,540,246 | 2/1951 | Roe | 200/161 |
| 2,901,757 | 9/1959 | Remington | 115/70 |
| 3,210,494 | 10/1965 | Murdock | 200/161 |
| 3,262,413 | 7/1966 | Douglas | 115/70 |
| 3,371,646 | 3/1968 | Mela | 115/70 |

*Primary Examiner*—Carroll B. Dority, Jr.
*Assistant Examiner*—Ira S. Lazarus
*Attorney, Agent, or Firm*—Ulle C. Linton

[57] ABSTRACT

The present invention refers to a safety stopping device for marine engines and employs a cord connected at one end to the pilot of the boat and at its other end to the safety device for the grounding of the ignition circuit of the engine either by operating a pushbutton, or by ripping off said cord held between said pushbutton and a retaining head traversing said button and connected by a stem to a metallic head capable by its axial movement to connect two fixed contact terminals interposed in said ignition circuit.

7 Claims, 4 Drawing Figures

INVENTOR
ALICE LOUISE ROSALIE LARIVIERE widow GIROUX

By Sinton and Sinton
ATTORNEYS

SAFETY STOPPING DEVICE FOR MARINE ENGINES

Matter enclosed in heavy brackets [ ] appears in the original patent but forms no part of this reissue specification; matter printed in italics indicates the additions made by reissue.

The present invention relates to an improvement in safety devices for stopping marine engines.

Two cycle marine engines with a magnetic flywheel are originally provided with a stop button for grounding the ignition circuit, and some engines have a safety device having the same electrical function whose triggering, subordinated to the ejection of the pilot driving the boat, is obtained by means of a flexible connection attached at one end to the pilot and connected by its other extremity to an extractable element normally keeping the safety device in a cocked position. This safety device is attached either directly to the engine, or at a certain distance from it at any selected pointed of the boat.

Use of such safety devices has led to the observation that, in the first case, the manipulation of the engine assembly sometimes had the tendency of causing the deterioration of the device while, in the second case, the flying wires connected to the device and hindering the pilot are apt to cause, during the eventual ejection of the pilot, the hooking of the element carried by the extremity of the cord attached to said pilot.

The device of the present invention, which remedies these drawbacks, is remarkable in that the engine stopping button and the safety device are combined in a same housing and in that the control of the safety device "per se," to obtain the "open" or engine "operating" position, is obtained by means of a simple cord.

To this end and according to one mode of execution, the device is composed of a push button with elastic recall whose contact element mounted elastically in said button and moveable axially within it, is normally moved and locked at a certain distance from two terminals so that it can be brought towards said terminals either manually or automatically independently by releasing the locking system, and said terminals are connected to engine ignition circuit.

According to a particular feature of the invention, the locking system of the device is formed by a simple cord of suitable diameter interposed between the push button and a retaining head extending from the contacting element to the outside.

The invention is better understood from the following description in reference to the attached drawing, in which.

Figure 2:
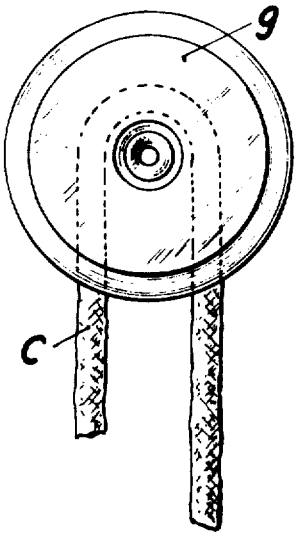
FIG. 2 is a side view from the right side of FIG. 1.

Referring to the drawing, the safety device is formed by an insulating housing formed of four cylindrical and coaxial parts comprising a threaded connection 1 having a base 1' and a nut 2, for the fastening of the unit to any wall P, a sleeve 3 screwed to the base of said connection and provided with an inner shoulder 3', a sleeve 4 slideably extending into sleeve 3 and retained axially by a collar 4' cooperating with said shoulder 3' and, finally a cap 5 slideably positioned over the first sleeve 3.

The connection 1 constitutes the seat of two contact terminals 6 connected in the usual manner, by conducting wires, to the ground circuit to be established while the sleeve 4 and the cap 5 provide for the independent sliding of a contacting element of said two terminals formed by a metallic head 7 extended by a guide tail 8 terminated by a retaining head 9, fastened thereto by riveting for example.

The cap 5, intended to act as a manually controlled push button, is constantly subjected to the action of a recall spring 10, interposed during assembly between it and sleeve 3, while the contacting element 7 capable of being pushed by this button can itself automatically close the circuit due to a spring 11, more powerful than spring 10, interposed between head 7 and sleeve 4 and normally tending to hold the contacting head 7 applied against terminals 6.

The device thus formed, intended in the present case to be used with marine engines, allows by the combination of the two separate movements of the contacting element 7, to manually stop the engine at the desired moment or to stop it automatically in case of the accidental ejection of the pilot driving the boat, with these two conditions being achieved by the presence or absence of a simple locking cord C previously engaged between the retaining head 9 of the contact element 7 and the cap 5 and attached by its other extremity to a part of the body of said pilot.

Figure 1:
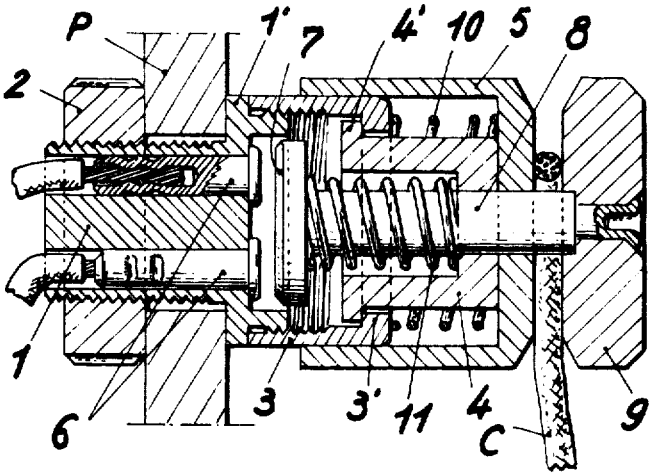
FIG. 1 is a longitudinal section of the present safety device in the open position.

In fact, FIG. 1 shows that the engagement of cord C in the above mentioned manner has the effect of causing the sliding of the contact element head 7 away from terminals 6 and compresses spring 11 bearing by its other extremity against the bottom of sleeve 4 which is normally stopped in sleeve 3 by its collar 4' under the effect of spring 10 of cap 5.

Figure 3:
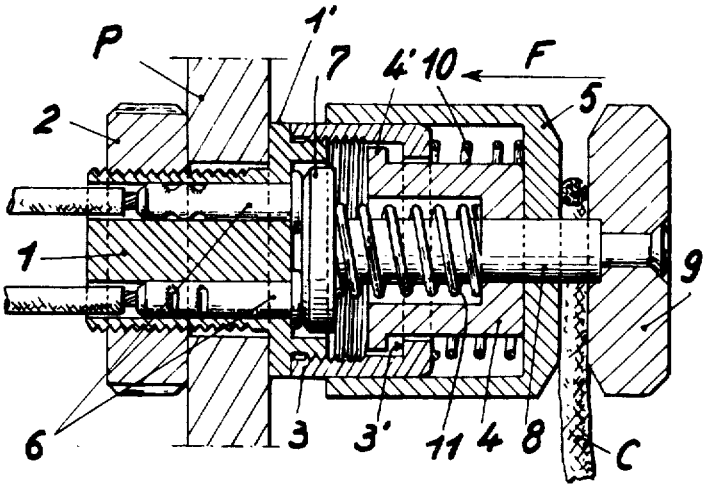
FIG. 3 is a longitudinal section of the device in the circuit closing position by operating the push button.

The assembly being thus locked and held in this position, if the pushbutton formed by the assembly of parts comprising the contacting element 7 and its spring 11, the sleeve 4, the cap 5, the cord C and the head 9, is moved in the direction of arrow F, the manual stopping of the engine is obtained, see FIG. 3.

Figure 4:
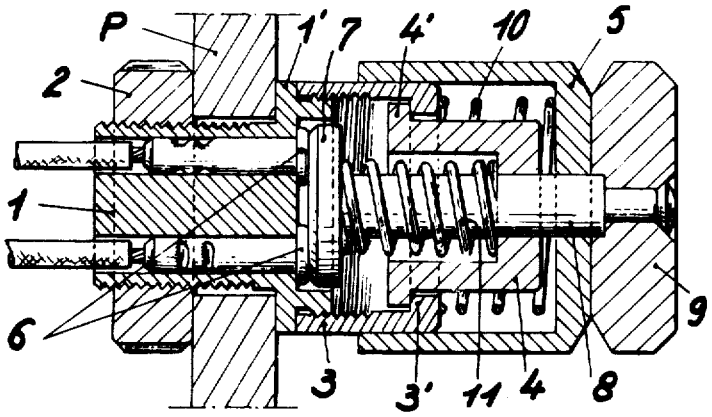
FIG. 4 is a similar section of the device showing the closing of the circuit by releasing the locking cord.

On the other hand, starting from the initial position represented in FIG. 1, if the cord C is extracted suddenly from the place it occupied between the cap 5 and the head 9, the spring 11, previously compressed by the contacting element 7, is released and the head 7 of the latter meets the terminals 6 and closes the ground circuit of the motor, see FIG. 4.

Of course the present invention is not limited to the mode of execution described and represented but on the contrary extends to all variants in form, materials and dimensions.

I claim:

1. A safety device for marine engines comprising an insulating member attachable to a support, a pair of contact terminals mounted in said member and connectable to the engine ignition circuit, a push button slideably connected to said member, a conducting head positioned for connecting said terminals, a stem connected to said head and slideably extending through said push button, a retaining head on said stem positioned adjacent said push button, resilient means between said conducting head and said push button tending to retain said conducting head connecting said terminals, a cord attachably to the pilot of a boat containing said engine and detachably mountable between said push button and said retaining head for withdrawing said conducting head from said terminals whereby when said pilot pulls said cord it is withdrawn from said retaining head and push button allowing said conducting head to connect said terminals and means operable by said pushbutton for moving said conducting head to said terminals when said cord is mounted between said push button and said retaining head.

2. A safety device as claimed in claim 1, wherein said means operable by said pushbutton consists of a sleeve slideably mounted on said stem, engaging said resilient means and positioned for being moved by said pushbutton for compressing said resilient means and thereby moving said conducting head to said terminals.

3. A safety device as claimed in claim 2 including further resilient means tending to move said pushbutton towards said retaining head.

4. A safety device as claimed in claim 2 wherein said sleeve has a shoulder through which said stem slideably extends, said resilient means is a coil spring on said stem and is positioned between said conducting head and said sleeve shoulder, said sleeve has a second shoulder, a second spring is positioned between said sleeve second shoulder and said pushbutton tending to move said pushbutton towards said retaining head.

5. A safety device as claimed in claim 4 including a second sleeve connected to said member and having a shoulder engaging the second shoulder of said first sleeve for limiting the movement of said first sleeve away from said member.

6. A safety device as claimed in claim 4 wherein said first mentioned spring is stronger than said second spring.

7. A safety device for marine engines comprising an insulating member attachable to a support, a pair of contact terminals mounted in said member and connectable to the engine ignition circuit, a pushbutton slideably connected to said member, resilient means tending to move said pushbutton from said member, conducting means resiliently retained in electrical contact with said terminals, means connected to said conducting means and slideably extending through said pushbutton, a cord connectable to the pilot of a boat containing said engine and detachably positioned between said pushbutton and said connecting means for detachably retaining said connecting means in a position withdrawing said conducting means out of contact with said terminals and said pushbutton being capable of moving said conducting means into its terminal contacting position independently of said connecting means.

* * * * *